No. 673,332. Patented Apr. 30, 1901.
O. J. BRACKNEY.
CLUTCH.
(Application filed Oct. 10, 1900.)
(No Model.)
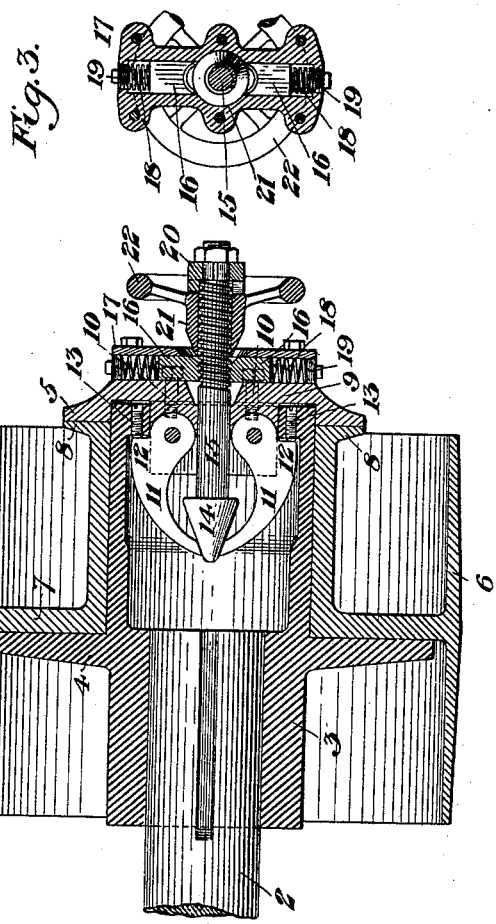
WITNESSES
INVENTOR
O. J. Brackney

UNITED STATES PATENT OFFICE.

ORVILLE J. BRACKNEY, OF BUTLER, PENNSYLVANIA, ASSIGNOR OF ONE-HALF TO JOSEPH B. SHERMAN, OF SAME PLACE.

CLUTCH.

SPECIFICATION forming part of Letters Patent No. 673,332, dated April 30, 1901.

Application filed October 10, 1900. Serial No. 32,602. (No model.)

*To all whom it may concern:*

Be it known that I, ORVILLE J. BRACKNEY, of Butler, in the county of Butler and State of Pennsylvania, have invented a new and useful Improvement in Clutches, of which the following is a full, clear, and exact description, reference being had to the accompanying drawings, forming part of this specification, in which—

Figure 1 is a longitudinal section showing a preferred form of my improved clutch arranged for the end of a shaft. Fig. 2 is an end elevation of the same, and Fig. 3 is a broken detail showing the divided nut.

My invention relates to the class of clutches for connecting wheels or pulleys to shafts and is designed to provide a simple and effective device of this character by which the power may be gradually applied and which will quickly and easily disconnect the shaft and wheel.

In the drawings, 2 represents a shaft having keyed to its end portion a hub 3, having a hollow body portion, as shown, and provided with annular flanges 4 and 5. The pulley 6 is provided with a web portion 7 and a flange 8, which fit against the flanges 4 and 5, respectively, the binding engagement being obtained by pressing these flanges into contact with each other. The flange 5 is formed as part of a cover-plate 9, which is secured to the end of the hub by screws 10, a slight space being left between the cap-plate and the heads of these screw-bolts to allow a slight endwise movement of the cover-plate. This plate is provided with a central extension which fits within a hole leading to the cavity of the hub, and in this extension are pivoted curved levers 11, which swing in opposite directions and have projections 12, arranged to fulcrum upon adjustable screws 13, secured in the end of the hub. The inwardly-curved ends of the levers fit upon a conical head 14, secured to a shaft 15, which extends through a central hole in the cover-plate 9 and is screw-threaded in its outer portion.

A split nut engages the screw-threads of the shaft 15, this nut being formed by two halves 16 16 in the form of blocks sliding in guideways formed in a box 17, secured to the face of the cover-plate. The parts of the split nut are normally forced inward, so that their inner screw-threaded portions engage the shaft by means of springs 18 pressing upon their outer ends and held in place by screw-plugs 19 or other suitable means.

A small collar or hub 20 is rigidly secured to the outer end of the shaft 15 and is provided with projections arranged to interlock with similar projections upon the hub 21 of hand-wheel 22. This hub is of sufficient size to slide over the square threads upon the shaft, the lugs forming a crab-clutch connection with the shaft 15. This hand-wheel may therefore be slid in either direction upon the shaft.

The screw-threads upon the shaft 15 extend in the opposite direction from the direction of rotation of the shaft 2, and when the clutch is disconnected, the shaft being driven, the pulley remains stationary thereon. To connect the pulley or wheel and the shaft, the operator takes hold of the hand-wheel and pulls it into engagement with the hub 20. The shaft 15 thus being held against rotation, the turning of the split nut will force the cone 14 inwardly, and thus swing the levers 11. As the projections 12 engage the adjustable pins or screws 13 they fulcrum thereon, and thus draw the cover-plate with great force against the flange 8. The flanges of the pulley are thus gripped between the stationary flange on the shaft and the flange of the sliding cover-plate and a secure connection afforded.

To disconnect the parts, it is only necessary to push the hand-wheel inwardly, when the forward tapering portion of its hub engages suitable inclined portions at the inner ends of the halves of the nut, thus forcing them outwardly and allowing the shaft 15 to move endwise, the cover-plate thus being released to destroy the gripping action.

The advantages of my invention will be apparent to those skilled in the art. The device is simple, neat in appearance, and gives a strong gripping action. The clutch is easily and quickly disconnected, and the power may be applied gradually by allowing the hand-wheel to slip in making the connection.

Many changes may be made in the form and arrangement of the parts without departing from my invention.

I claim—

1. In a clutch, a shaft having a wheel or pulley loose thereon, a plate movable endwise and arranged to engage the wheel or pulley, another shaft having a screw-threaded portion and provided with inclined wedge-faces, levers bearing upon said wedge-faces and arranged to force the plate against the wheel, and an outer part having an innerly-screw-threaded portion engaging the screw-threads of the shaft and arranged to move the shaft endwise to actuate the clutch; substantially as described.

2. In a clutch, a shaft having a wheel or pulley loose thereon, an endwise-movable plate arranged to engage the pulley, levers mounted upon said plate and having their arms bearing upon inclined faces of another shaft, said latter shaft having a screw-threaded portion, an outer part having inner screw-threads engaging the shaft screw-threads and arranged to move the shaft endwise, and a hand-wheel for the screw-threaded shaft and arranged to actuate the clutch; substantially as described.

3. A shaft having a hollow hub secured thereto and provided with a loose cover-plate, levers within the hollow hub and pivoted to the cover-plate, a shaft having a head engaging the levers and provided with a screw-threaded portion, a split nut engaging the screw-threaded portion, and a hand-wheel having detachable connection with the latter shaft, and arranged to force back the sections of the nut; substantially as described.

4. In a clutch, a clamping-plate, levers arranged to actuate the same, a screw-threaded shaft having connections to actuate the levers, and a split nut having spring-pressed sections engaging said shaft; substantially as described.

5. In a clutch, a hollow rotatory hub, a wheel loose thereon, an endwise-movable plate or ring having levers pivoted thereto, a central shaft having an inclined portion engaging the levers, and provided with a screw-threaded portion engaging screw-threaded portions in the cover-plate and a hand-wheel upon the screw-threaded shaft; substantially as described.

6. In a clutch, an endwise-movable plate or ring arranged to clamp the pulley, levers pivoted to the plate, a central shaft arranged to actuate the levers, a split nut having screw-thread connection with said shaft, and sliding upon the clamping-plate, springs normally forcing the sections of the split nut inwardly, and a hand-wheel having detachable connection with the shaft and arranged to slide over the screw-threaded portion and retract the parts of the nut; substantially as described.

7. In a clutch, a clamping-plate, levers arranged to actuate the same, a screw-threaded shaft having connections to swing the levers, and a split nut composed of sliding sections having guides, and provided with means for sliding toward and from the shaft in opposite directions; substantially as described.

In testimony whereof I have hereunto set my hand.

ORVILLE J. BRACKNEY.

Witnesses:
ALBERT L. BOWSER,
H. E. COULTER.